United States Patent
Jung

(10) Patent No.: US 11,491,937 B2
(45) Date of Patent: Nov. 8, 2022

(54) AIRBAG CONTROL APPARATUS AND AIRBAG CONTROL METHOD

(71) Applicants: HYUNDAI MOTOR COMPANY, Seoul (KR); KIA MOTORS CORPORATION, Seoul (KR)

(72) Inventor: Yong Hoon Jung, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 222 days.

(21) Appl. No.: 16/895,368

(22) Filed: Jun. 8, 2020

(65) Prior Publication Data

US 2021/0170971 A1 Jun. 10, 2021

(30) Foreign Application Priority Data

Dec. 6, 2019 (KR) .................. 10-2019-0161990

(51) Int. Cl.
| | |
|---|---|
| *B60R 21/0132* | (2006.01) |
| *B60R 21/0134* | (2006.01) |
| *B60W 30/08* | (2012.01) |
| *B60W 40/13* | (2012.01) |

(52) U.S. Cl.
CPC ...... *B60R 21/0132* (2013.01); *B60R 21/0134* (2013.01); *B60W 30/08* (2013.01); *B60W 40/13* (2013.01); *B60R 2021/01322* (2013.01); *B60W 2520/105* (2013.01)

(58) Field of Classification Search
CPC ........... B60R 21/0132; B60R 21/0134; B60R 21/01516; B60R 2021/01322; B60W 2520/105; B60W 2540/221; B60W 40/107; B60W 40/13; B60W 30/08; B60W 30/095; B60W 30/0953; B60W 2530/10

See application file for complete search history.

(56) References Cited

U.S. PATENT DOCUMENTS

| | | | |
|---|---|---|---|
| 5,904,730 A | 5/1999 | Yamazaki et al. | |
| 6,173,224 B1* | 1/2001 | Riesner | B60R 21/01332 |
| | | | 701/47 |
| 6,433,688 B1* | 8/2002 | Bomya | G01V 3/081 |
| | | | 340/540 |
| 9,517,767 B1* | 12/2016 | Kentley | B60R 21/01 |
| 9,637,078 B2* | 5/2017 | Bull | B60R 21/0132 |
| 9,731,728 B2* | 8/2017 | Nguyen Van | B60W 50/029 |
| 10,377,331 B2* | 8/2019 | Freienstein | B60R 21/0132 |
| 10,479,353 B2* | 11/2019 | Nguyen Van | G01S 7/40 |
| 10,543,837 B2* | 1/2020 | Patana | B60W 10/04 |
| 10,562,527 B2* | 2/2020 | Reckziegel | B60W 30/0956 |
| 10,906,494 B1* | 2/2021 | Chan | B60R 21/01538 |
| 2019/0232970 A1* | 8/2019 | Watanabe | G08G 1/16 |

FOREIGN PATENT DOCUMENTS

KR 10-1998-023938 A 7/1998

* cited by examiner

*Primary Examiner* — Laura Freedman
(74) *Attorney, Agent, or Firm* — Lempia Summerfield Katz LLC

(57) ABSTRACT

An airbag control apparatus includes: an airbag, an airbag driver that deploys the airbag, and a processor that estimates a vehicle momentum and a crash progress degree based on a longitudinal acceleration and a vehicle speed upon a vehicle crash, determines deployment of the airbag based on the vehicle momentum and the crash progress degree and controls the airbag driver when the deployment of the airbag is determined.

19 Claims, 18 Drawing Sheets

AIRBAG CONTROL APPARATUS AND AIRBAG CONTROL METHOD

CROSS-REFERENCE TO RELATED APPLICATION

This application claims priority to and the benefit of Korean Patent Application No. 10-2019-0161990, filed on Dec. 6, 2019, the entire contents of which are incorporated herein by reference.

FIELD

The present disclosure relates to an airbag control apparatus and an airbag control method.

BACKGROUND

The statements in this section merely provide background information related to the present disclosure and may not constitute prior art.

In general, an airbag is a safety device for protecting a driver or an occupant from an impact caused by a vehicle crash. Such an airbag system detects a crash based on a measurement value (acceleration sensor value) of an acceleration sensor mounted on a vehicle and deploys the airbag when the measurement value exceeds a threshold. The acceleration sensor value is measured in proportion to a vehicle speed because the acceleration sensor value is proportional to the kinetic energy of the vehicle. However, we have discovered that the acceleration sensor value measured at the time of a vehicle crash may vary depending on a crash speed, a vehicle mass, the shape of a crash barrier and/or a crash portion even under the same conditions. Thus, when the airbag is deployed using only the acceleration sensor value, the airbag is unnecessarily deployed or the airbag is undeployed with respect to an impact amount due to the crash, deteriorating the safety of a vehicle occupant.

SUMMARY

The present disclosure provides an airbag control apparatus and method for determining airbag deployment in consideration of a longitudinal acceleration, a vehicle speed, and a vehicle mass.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an airbag control apparatus includes: an airbag, an airbag driver that deploys the airbag, and a processor that estimates a vehicle momentum and a crash progress degree based on a longitudinal acceleration and a vehicle speed upon a vehicle crash, determines deployment of the airbag based on the vehicle momentum and the crash progress degree and controls the airbag driver when the deployment of the airbag is determined.

The processor may include a signal processor that calculates and outputs a cumulative speed, an initial crash speed, and an estimated current speed by using the longitudinal acceleration and the vehicle speed input from sensors and in-vehicle devices mounted on a vehicle, an estimator that calculates the vehicle momentum and a crash object penetration distance based on the longitudinal acceleration, the initial crash speed, and the estimated current speed, and determines a threshold decrease factor based on the vehicle momentum and the crash object penetration distance which are calculated, and a controller that determines an airbag deployment threshold based on the threshold decrease factor, and determines whether to deploy the airbag based on the airbag deployment threshold.

The signal processor may calculate a vehicle mass based on at least one of an occupant weight, a load weight measured by a weight sensor, or an empty-vehicle weight included in vehicle specification information.

The estimator may calculate a pre-crash momentum and a current momentum by using the initial crash speed, the estimated current speed, and the vehicle mass.

The estimator may determine the threshold decrease factor based on a difference between the pre-crash momentum and the current momentum.

The estimator may calculate an effective momentum using the initial crash speed, the estimated current speed, and the vehicle mass when a crash target is a fixed object.

The estimator may calculate an effective momentum using a relative initial crash speed of a moving object, the estimated current speed, the vehicle mass and a weight of the moving object when a crash target is the moving object.

The estimator may calculate the crash object penetration distance using a crash time, a current time, the estimated current speed, the initial crash speed, and the longitudinal acceleration.

The controller may determine the airbag deployment threshold by applying the threshold decrease factor to a default basic airbag deployment threshold.

The controller may determine the deployment of the airbag when the longitudinal acceleration is greater than or equal to an acceleration threshold and the cumulative speed is greater than or equal to the airbag deployment threshold.

According to an aspect of the present disclosure, an airbag control method includes: detecting, by a sensor, a longitudinal acceleration and a vehicle speed upon a vehicle crash; estimating, by a processor, a vehicle momentum and a crash progress degree based on the longitudinal acceleration and the vehicle speed; determining, by the processor, deployment of an airbag based on the vehicle momentum and the crash progress degree; and deploying, by the processor, the airbag when the deployment of the airbag is determined.

The estimating of the vehicle momentum and the crash progress degree may include: calculating a cumulative speed, an initial crash speed, and an estimated current speed using the longitudinal acceleration and the vehicle speed, calculating a pre-crash momentum, a current momentum and an effective momentum based on the longitudinal acceleration, the initial crash speed and the estimated current speed, and calculating a crash object penetration distance using the longitudinal acceleration and the estimated current speed.

The airbag control method may further include: calculating a vehicle mass based on at least one of a passenger weight, a load weight measured by a weight sensor, or an empty-vehicle weight included in vehicle specification information when calculating the cumulative speed, the initial crash speed, and the estimated current speed.

The pre-crash momentum and the current momentum may be calculated using the initial crash speed, the estimated current speed, and the vehicle mass.

A threshold decrease factor may be determined based on a difference between the pre-crash momentum and the current momentum.

The effective momentum may be calculated using the initial crash speed, the estimated current speed, and the vehicle mass when a crash target is a fixed object.

The effective momentum may be calculated using a relative initial crash speed of a moving object, an estimated current speed, the vehicle mass and a weight of the moving object when a crash target is the moving object.

The determining of the deployment of the airbag may include determining a threshold decrease factor based on the vehicle momentum and the crash object penetration distance, determining an airbag deployment threshold based on the threshold decrease factor, and determining whether to deploy the airbag based on the airbag deployment threshold.

The determining of the airbag deployment threshold may include determining the airbag deployment threshold by applying the threshold decrease factor to a default basic airbag deployment threshold.

The determining of whether to deploy the airbag may include determining the deployment of the airbag when the longitudinal acceleration is greater than or equal to an acceleration threshold and the cumulative speed is greater than or equal to the airbag deployment threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
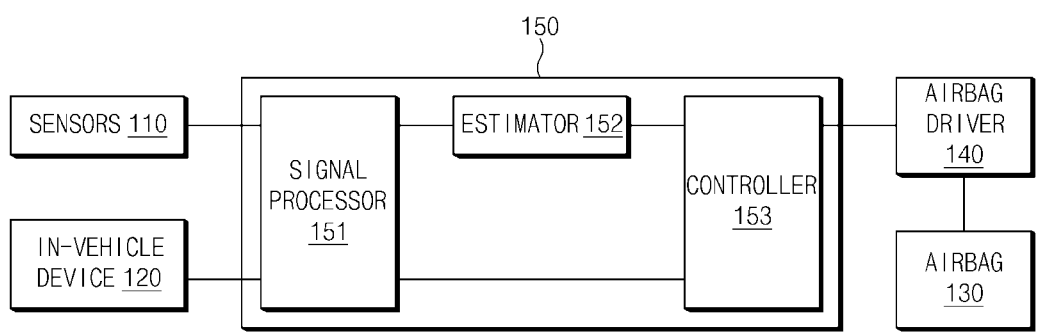
FIG. 1 is a block diagram showing an airbag control apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
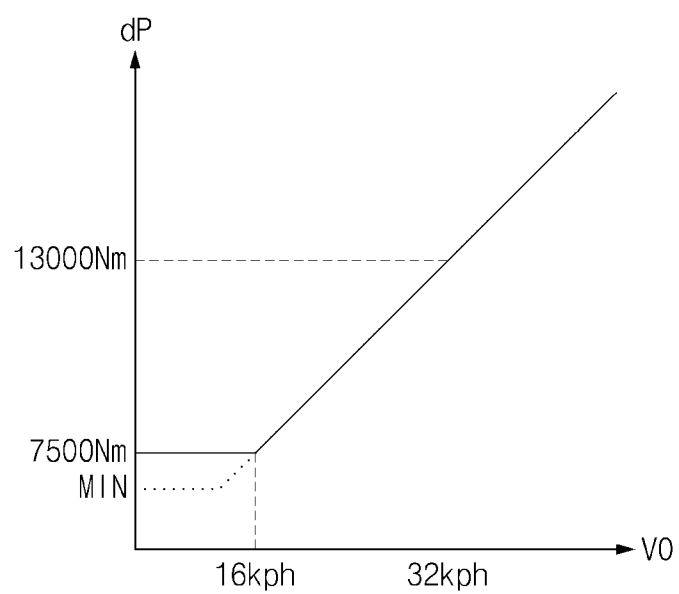
FIG. 2 is a diagram for describing settings of effective exercise thresholds according to one form of the present disclosure.
Figure 3:
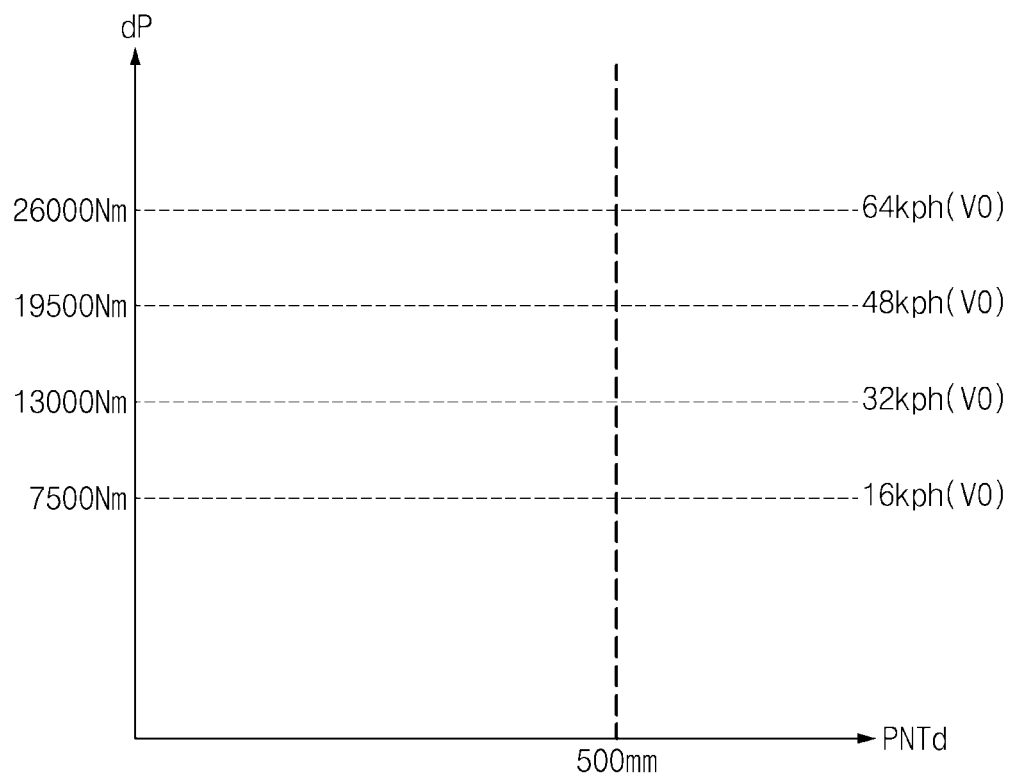
FIGS. 3 to 5 are diagrams for respectively describing the momentum-penetration threshold model settings according to one form of the present disclosure.
Figure 4:
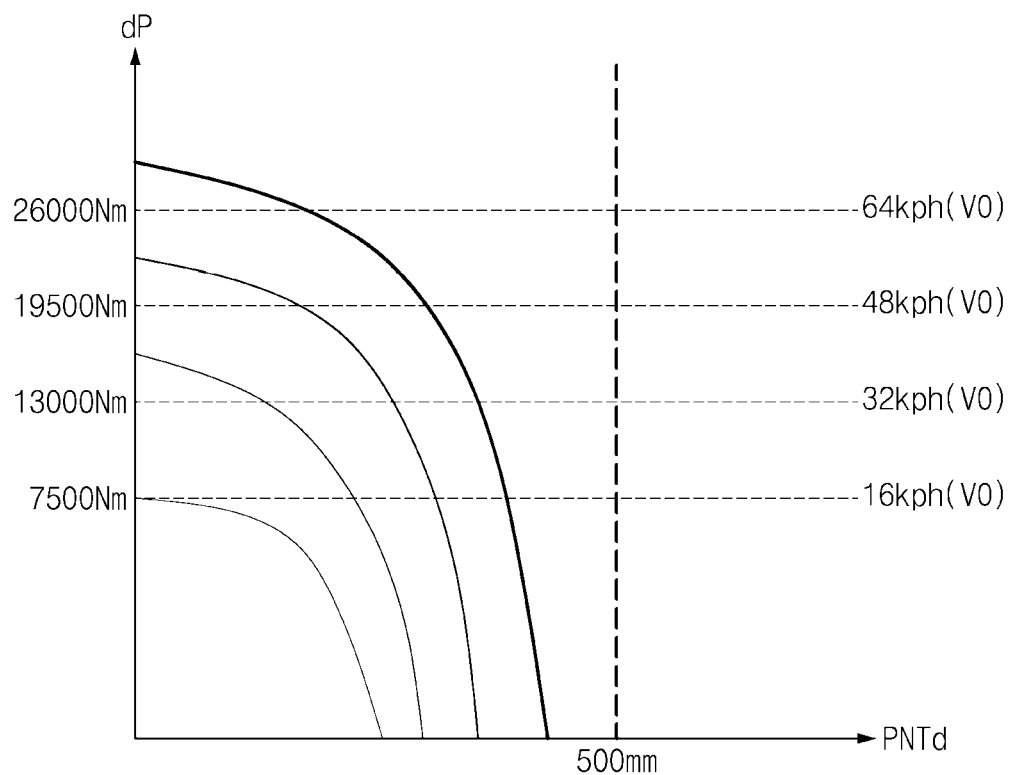
Figure 5:
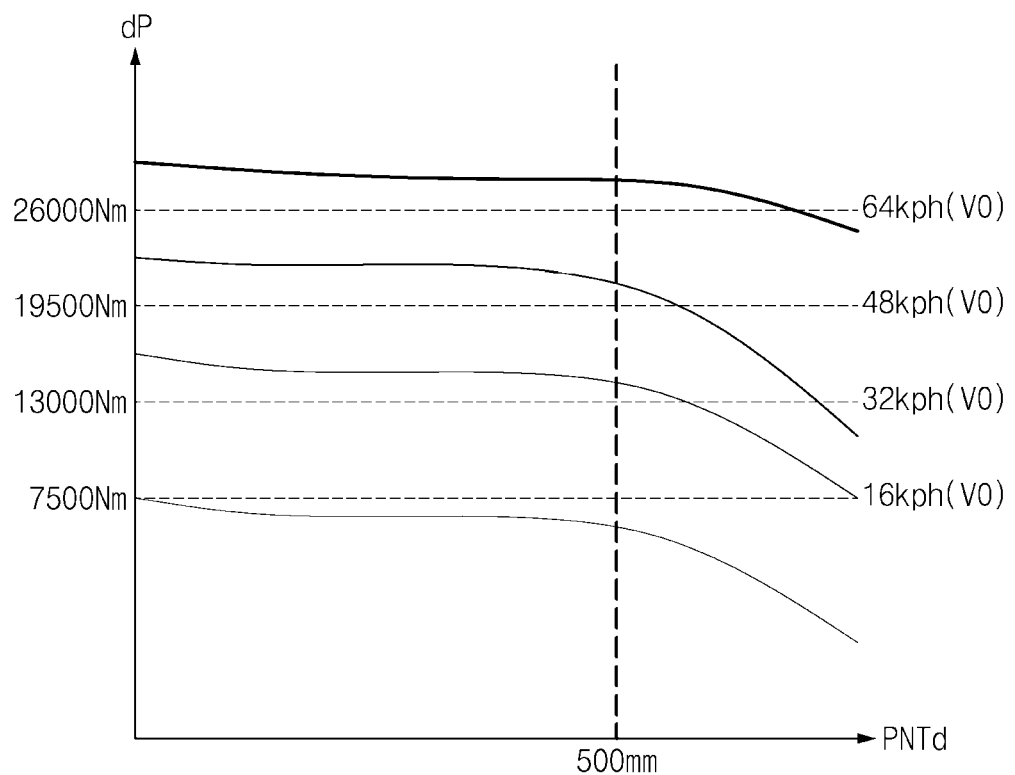

FIG. 1 is a block diagram showing an airbag control apparatus in one form of the present disclosure; FIG. 2 is a diagram for describing settings of effective exercise thresholds according to another form of the present disclosure; FIGS. 3 to 5 are diagrams for describing the momentum-penetration threshold model settings according to some forms of the present disclosure.

As illustrated in FIG. 1, an airbag control apparatus may include sensors 110, an in-vehicle device 120, an airbag 130, an airbag driver 140, and a processor 150.

The sensors 110 may be mounted on a vehicle to sense (detect) speed information and/or weight information. For example, the sensors 110 may measure (sense) an acceleration of the vehicle, a vehicle speed (a driving speed), an occupant weight and/or a load weight, and the like. The sensors 110 may include an acceleration sensor, a wheel speed sensor, a weight sensor, a crash sensor, and/or the like.

The in-vehicle device 120 may be a device mounted on the vehicle to detect driving information and may include an advanced driver assistance systems (ADAS), a vehicle to vehicle (V2V) communication device, an electronic stability control (ESC), global positioning system (GPS) receiver and/or the like. The in-vehicle device 120 may acquire information such as a vehicle speed, a speed of a surrounding vehicle, and/or a weight of the surrounding vehicle.

The airbag 130 may be mounted in a horn portion of a steering wheel and in the front and the side of each seat in the vehicle. Although one airbag 130 is illustrated in the present form, the present disclosure is not limited thereto, and one or more airbags 130 may be mounted in the vehicle. For example, a side airbag and a front airbag facing a driver seat and a side airbag and a front airbag facing a passenger seat may be mounted in the vehicle. One or more airbags 130 may be selectively deployed by the airbag driver 140. In other words, the one or more airbags 130 may be deployed at different deployment pressures, at different deployment speeds and in different deployment directions. The airbag 130 may be connected to a motor (not shown) to enable six-axis movement (x, y, z, x-axis rotation, y-axis rotation and z-axis rotation) at a connection portion for control of the deployment direction.

The airbag driver 140 may perform deployment of the airbag 130 according to a deployment request of the processor 150. That is, the airbag driver 140 may deploy the airbag 130 according to a determination to deploy the airbag of the processor 150.

The processor 150 may control the overall operation of the airbag control apparatus. The processor 150 may be implemented with at least one of an application specific integrated circuit (ASIC), a digital signal processor (DSP), a programmable logic device (PLD), field programmable gate array (FPGAs), a central processing unit (CPU), microcontrollers, and microprocessors. The processor 150 may include a memory (not shown). Software to be executed by the processor 150 may be stored in the memory. The memory may be implemented with at least one of storage media (recording media), such as a flash memory, a hard disk, a random access memory (RAM), a static random access memory (SRAM), a read only memory ROM), a Programmable Read Only Memory (PROM), an Electrically Erasable and Programmable ROM (EEPROM), a Erasable and Programmable ROM (EPROM), and a register.

The processor 150 may determine whether to deploy the airbag in consideration of an acceleration of the vehicle, a vehicle speed, and a weight of the vehicle, and request the deployment of the airbag. The processor 150 may include a signal processor 151, an estimator 152, and a controller 153.

The signal processor 151 may receive the speed information and the weight information from the sensors 110 and the in-vehicle device 120 and processes the speed information and the weight information. The signal processor 151 may receive an acceleration signal measured by the acceleration sensor, digitize the acceleration signal, and output a longitudinal acceleration Ax. The longitudinal acceleration Ax may be used to determine the presence or absence of a crash and a degree of crash.

In addition, the signal processor 151 may accumulate acceleration signals measured by the acceleration sensor to calculate a cumulative speed dV. The cumulative speed dV may be used to determine a crash progress degree.

The signal processor 151 may receive the vehicle speed in real time from a wheel speed sensor, an ADAS, an ESC, a GPS, or the like. When the signal processor 151 detects a vehicle crash through the acceleration sensor, the signal processor 151 may determine a vehicle speed immediately before the crash as the vehicle speed at the time of crash, and store the vehicle speed as an initial crash speed V0.

The signal processor 151 may calculate an estimated current vehicle speed Vcrnt by subtracting the cumulative speed dV from the initial crash speed V0. The estimated current vehicle speed Vcrnt may be expressed as shown in [Equation 1].

$$Vcrnt = V0 - \int_{t0}^{tx} Ax\, dt \qquad \text{[Equation 1]}$$

where t0 is a crash time and tx is a current time.

The signal processor 151 may calculate a vehicle mass "m" using vehicle specification information, vehicle occupant information (driver and passenger), load information, and the like, which are stored in the memory in advance. Here, the vehicle occupant information may be obtained using a weight sensor mounted for each seat, and the load information may be obtained through a weight sensor mounted in a loading bay (e.g., a trunk). For example, the signal processor 151 may obtain the vehicle mass "m" by adding an empty-vehicle weight included in the vehicle specification information and/or an occupant weight and a load weight, which are measured by the weight sensors.

The estimator 152 may calculate a momentum and an airbag deployment threshold decrease factor DF based on information input from the signal processor 151. The estimator 152 may receive the longitudinal acceleration Ax, the initial crash speed V0, the estimated current speed Vcrnt, and the vehicle mass "m" from the signal processor 151, and calculates a pre-crash momentum P. The estimator 152 may calculate the pre-crash momentum P by using Equation 2 below.

$$P = mV \qquad \text{[Equation 2]}$$

where V represents the vehicle speed, that is, the initial crash speed V0.

The estimator 152 may calculate a current momentum Pcrnt that is decreasing after the crash by using the estimated current speed Vcrnt and the vehicle mass "m". The current momentum Pcrnt may be defined as shown in Equation 3.

$$Pcrnt = m \cdot Vcrnt \qquad \text{[Equation 3]}$$

The estimator 152 may calculate an effective momentum dP based on the initial crash speed V0, the estimated current speed Vcrnt, and the vehicle mass "m". The effective momentum dP may mean a vehicle momentum in a situation where the vehicle collides with a specific target (crash object or crash target). In other words, the effective momentum dP may refer to a difference between a pre-crash momentum and a post-crash momentum.

When the specific target is a fixed object (e.g., a wall or the like), the effective momentum dP may be expressed as shown in Equation 4.

$$dP = m \times (V0 - Vcrnt) \qquad \text{[Equation 4]}$$

When the specific target is a moving object (e.g., a vehicle or the like), the effective momentum dP may be calculated using Equation 5.

$$dP = (m + m_{rel}) \times (V0_{rel} - Vcrnt) \qquad \text{[Equation 5]}$$

where $m_{rel}$ is a mass of the moving object and $V0_{rel}$ is a relative initial crash speed of the moving object when the vehicle is a reference.

In addition, the estimator 152 may estimate a movement distance of the vehicle from the crash time t0 to the current time tx based on the estimated current speed Vcrnt and determine how much the crash object penetrates the vehicle. In other words, the estimator 152 may calculate a penetration distance of the crash object (penetration amount, PNTd) using Equation 6.

$$PNTd = \int_{t0}^{tx} Vcrnt\, dt \qquad \text{[Equation 6]}$$

The estimator 152 may determine the difference between the pre-crash momentum P and the current momentum Pcrnt, that is, the effective momentum dP as the threshold decrease factor DF. The estimator 152 may determine whether to adjust an airbag deployment threshold by using the threshold decrease factor DF in consideration of the relationship between the effective momentum dP and the penetration amount PNTd of the crash object.

The method for determining the threshold decrease factor DF may include the first step of setting an effective penetration amount threshold, the second step of setting an effective momentum threshold, and the third step of setting a momentum-penetration amount threshold model.

In the first step, the estimator 152 may set the effective penetration amount threshold by multiplying a time required to deploy the airbag, that is, a required time to fire RTTF and the initial crash speed V0. In this case, considering a layout from a vehicle front structure (e.g., bumper or the like) to a power supply device (not shown) of the airbag control apparatus, the effective penetration-amount threshold may be set within a range where the power supply is able to be maintained upon crash.

For example, when the minimum effective penetration amount and the maximum effective penetration amount are 0.7 m and 0.5 m in the following crash situation, the effective penetration-amount threshold (e.g., 500 mm) is set within a range of 0.5 m to 0.7 m.

[Crash situation]:
Crash mode, head-on small overlap (pole) to front pole
Initial crash speed, 64 kph to 32 kph
RTTF, 40 ms to 55 ms Minimum Effective Penetration amount (64 kph× 1000/3600)×(40 ms/1000)=0.7 m Maximum Effective Penetration amount (32 kph× 1000/3600)×(55 ms/1000)=0.5m In the second step, the estimator 152 may determine a remaining momentum at the time (tx-RTTF) when the airbag deployment is desired, that is, the effective momentum threshold, by using an atypical crash minimum speed test data. To determine the effective momentum threshold, the slope of the two values may be determined based on an undeployed speed reference momentum as the minimum value and the momentum at the time of minimum atypical crash development and the effective momentum threshold according to a vehicle speed may be determined (set) using the calculated slope in the future.

For example, referring to FIG. 2, the estimator 152 may calculate the slope of two values based on the undeployed speed reference momentum MIN and the momentum 7500 Nm at the time of the minimum atypical crash deployment. Then, the estimator 152 may calculate the momentum 13000 Nm when the crash speed is 32 kph by using a slope previously calculated in the following crash situation and set the calculated momentum as the effective momentum threshold.

[Crash situation]:
Crash mode, front pole
Crash test speed, 32 kph
RTTF, 55 ms

In the third step, the momentum-penetration amount threshold model may be set based on the threshold determined in the first and second steps. For example, as shown in FIG. 3, the effective penetration amount threshold is fixed to 500 mm, and the effective momentum threshold that varies for each initial crash speed may be set using interpolation.

When the head-on crash test data is applied to the momentum-penetration amount threshold model, a graph trend is shown as in FIG. 4. In the case of the head-on crash of 16 kph, the crash object penetration amount PNTd may not reach the effective penetration amount threshold 500 mm, and no effective momentum dP remains. On the other hand, in the case of a high-speed head-on crash, the effective momentum threshold may be set based on the atypical crash development time for each speed, so that the effective momentum remains at the beginning of the head-on crash, but the penetration of the crash object no longer may not penetrate the vehicle due to the resistance of a vehicle structure over time.

On the other hand, when a crash with a pole or a sharp object occurs, the crash object penetration amount PNTd increases but a decrease in the effective momentum dP is small as shown in FIG. 5. When penetration of the crash object continues and the effective momentum remains, the airbag deployment threshold may be reduced based on the remaining effective momentum.

The controller 153 may determine whether to deploy the airbag by using the longitudinal acceleration Ax, the cumulative speed dV, and the threshold decrease factor DF. The controller 153 may receive the longitudinal acceleration Ax and the cumulative speed dV from the signal processor 151, and receive the threshold decrease factor DF from the estimator 152. The controller 153 may determine the airbag deployment threshold Thdv.Fin using the threshold decrease factor DF. Here, the airbag deployment threshold may mean a cumulative speed threshold that serves as a reference for determining airbag deployment. The controller 153 may calculate the airbag deployment threshold Thdv.Fin by applying the threshold decrease factor DF to a default airbag deployment threshold dV_Th. stored in the memory in advance as shown in Equation 7.

$$Thdv.Fin = dV\_Th. \times DF \quad \text{[Equation 7]:}$$

When the controller 153 determines that the effective momentum of the vehicle during the crash is large and the crash object has sufficiently penetrated into the vehicle, the controller 153 may transmit a deployment request signal requesting deployment of the airbag to the airbag driver 140. In other words, the controller 153 transmits an airbag deployment request to the airbag driver 140 when the longitudinal acceleration Ax is greater than or equal to an acceleration threshold ThAx and the cumulative speed dV is greater than or equal to an airbag deployment threshold Thdv.Fin. The airbag driver 140 may deploy the airbag 130 according to the airbag deployment request of the controller 153.

Meanwhile, the controller 153 may again determine the airbag deployment threshold Thdv.Fin when the longitudinal acceleration Ax is less than the acceleration threshold ThAx and/or the cumulative speed dV is less than the airbag deployment threshold Thdv.Fin.

Figure 6:
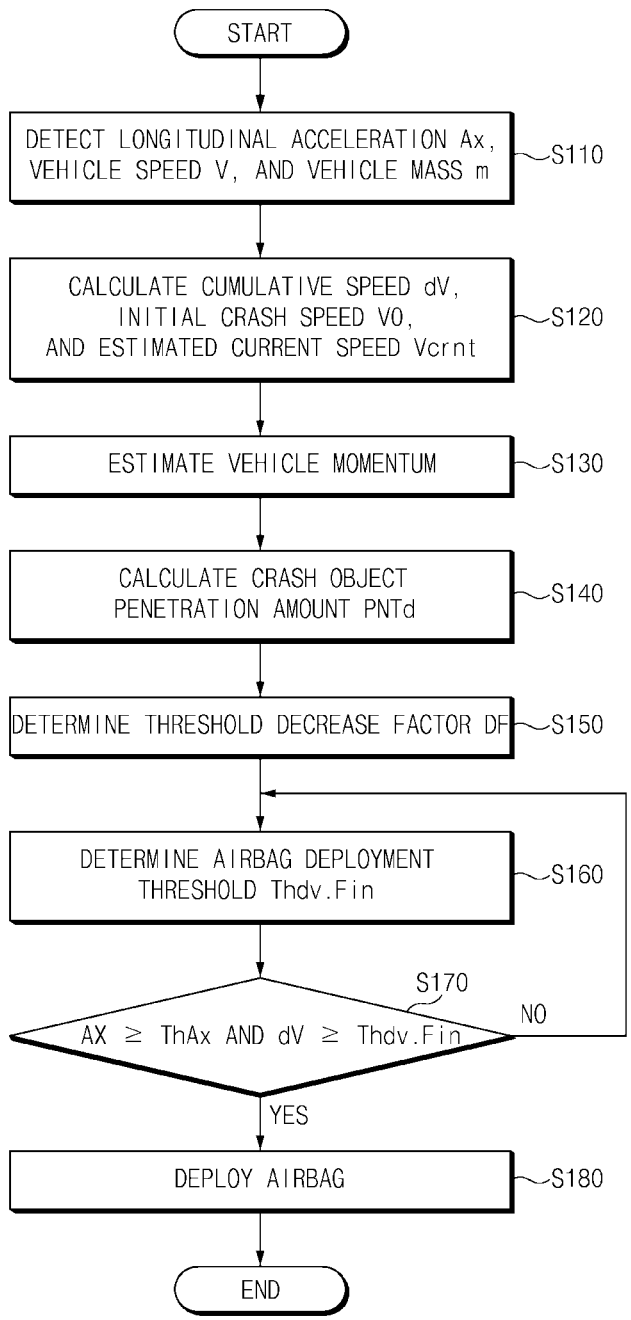
FIG. 6 is a flowchart illustrating an airbag control method according to another form of the present disclosure.

FIG. 6 is a flowchart illustrating an airbag control method according to one form of the present disclosure.

The processor 150 may detect the longitudinal acceleration Ax and the vehicle speed V measured by the sensors 110 and/or the in-vehicle devices 120 when crash is detected (S110). When vehicle crash is detected by a crash sensor, the processor 150 may detect a longitudinal acceleration and a vehicle speed immediately before or after the crash.

The processor 150 may calculate a cumulative speed dV, an initial crash speed V0 and an estimated current speed Vcrnt using the longitudinal acceleration and the vehicle speed (S120). The signal processor 151 of the processor 150 may digitize the acceleration signal, which is input from an acceleration sensor, and accumulate the acceleration signal to calculate a cumulative speed dV. The signal processor 151 may store the vehicle speed measured immediately before or after the crash as the initial crash speed V0. In addition, the signal processor 151 may calculate the estimated current speed Vcrnt by subtracting the cumulative speed dV from the initial crash speed V0. In addition, the signal processor 151 may calculate a vehicle mass "m" in consideration of an occupant weight and/or a load weight, which are measured by weight sensors based on an empty-vehicle weight included in vehicle specification information.

The processor 150 may estimate a vehicle momentum based on the acceleration, the crash initial speed, the expected current speed, and the vehicle mass (S130). The estimator 152 in the processor 150 may estimate a pre-crash momentum using the vehicle speed and the vehicle mass. The estimator 152 may estimate a current momentum in consideration of the estimated current speed and the vehicle mass. The estimator 152 may estimate an effective momentum based on the estimated current speed and the vehicle mass when a crash object is a fixed object and estimate the effective momentum based on the vehicle mass, the estimated current speed, the weight of the crash object and a relative initial crash speed of the crash object when the crash object is a moving object.

The processor 150 may calculate the crash object penetration amount PNTd using the longitudinal acceleration and the estimated current speed (S140). The estimator 152 may calculate the estimated current speed using the initial crash speed and the longitudinal acceleration, and compute a distance through which the vehicle has traveled from the crash time to the current time, that is, a penetration distance PNTd of the crash object, based on the calculated estimated current speed.

The processor 150 may determine whether to adjust an airbag deployment threshold by reflecting a threshold decrease factor DF based on the effective momentum dP and the crash object penetration amount PNTd (S150). When the crash object penetration amount is expected to reach the effective penetration amount threshold, the estimator 152 may determine adjustment of the airbag deployment threshold by reflecting a difference between a pre-crash momentum and a post-crash momentum (current momentum), that is, the threshold decrease factor DF.

The processor 150 may determine the airbag deployment threshold by reflecting the threshold decrease factor DF (S160). The controller 153 in the processor 150 may determine the airbag deployment threshold Thdv.Fin by applying the threshold decrease factor DF to a default airbag deployment threshold dV_Th. The processor 150 may determine airbag deployment based on the default airbag deployment threshold when it is determined not to apply the threshold decrease factor DF to the airbag deployment threshold.

The processor 150 may determine whether the longitudinal acceleration Ax is equal to or greater than an acceleration threshold ThAx and the cumulative speed dV is equal to or greater than the airbag deployment threshold Thdv.Fin (S170). The controller 153 may determine whether to deploy the airbag based on the longitudinal acceleration and the cumulative speed. The controller 153 may transmit an airbag deployment request to the airbag driver 140 when the airbag deployment is determined.

When the acceleration is greater than or equal to the acceleration threshold and the cumulative speed is greater than or equal to the airbag deployment threshold, the processor 150 may deploy the airbag 130 by controlling the airbag driver 140 (S180).

On the other hand, the processor 150 may again determine the airbag deployment threshold when the longitudinal acceleration is less than the acceleration threshold and/or the cumulative speed is less than the airbag deployment threshold.

Figure 7:
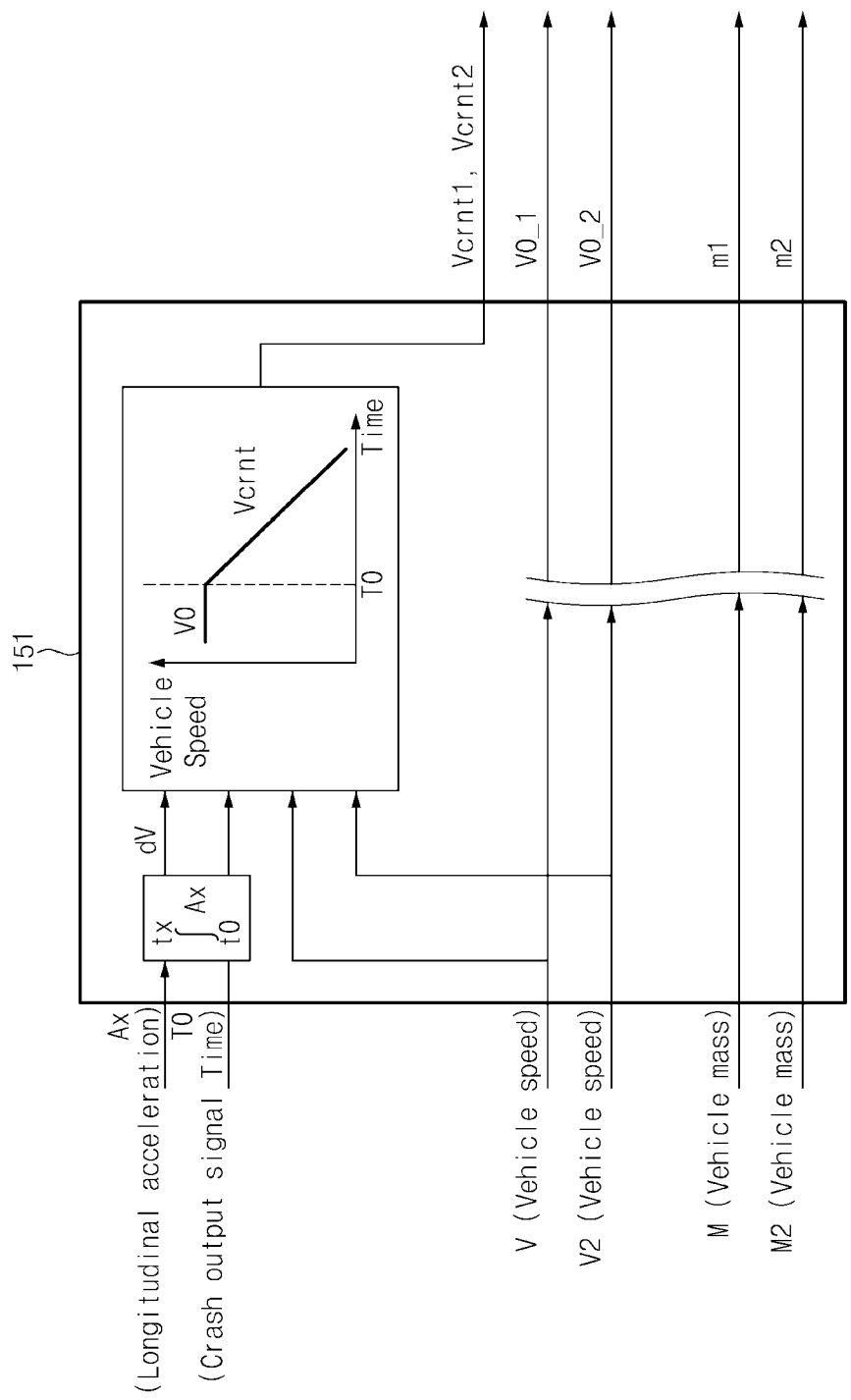
FIGS. 7 to 9 are diagrams for respectively describing an airbag control method when a vehicle equipped with an airbag control apparatus collides with a moving object according to one form of the present disclosure.
Figure 8:
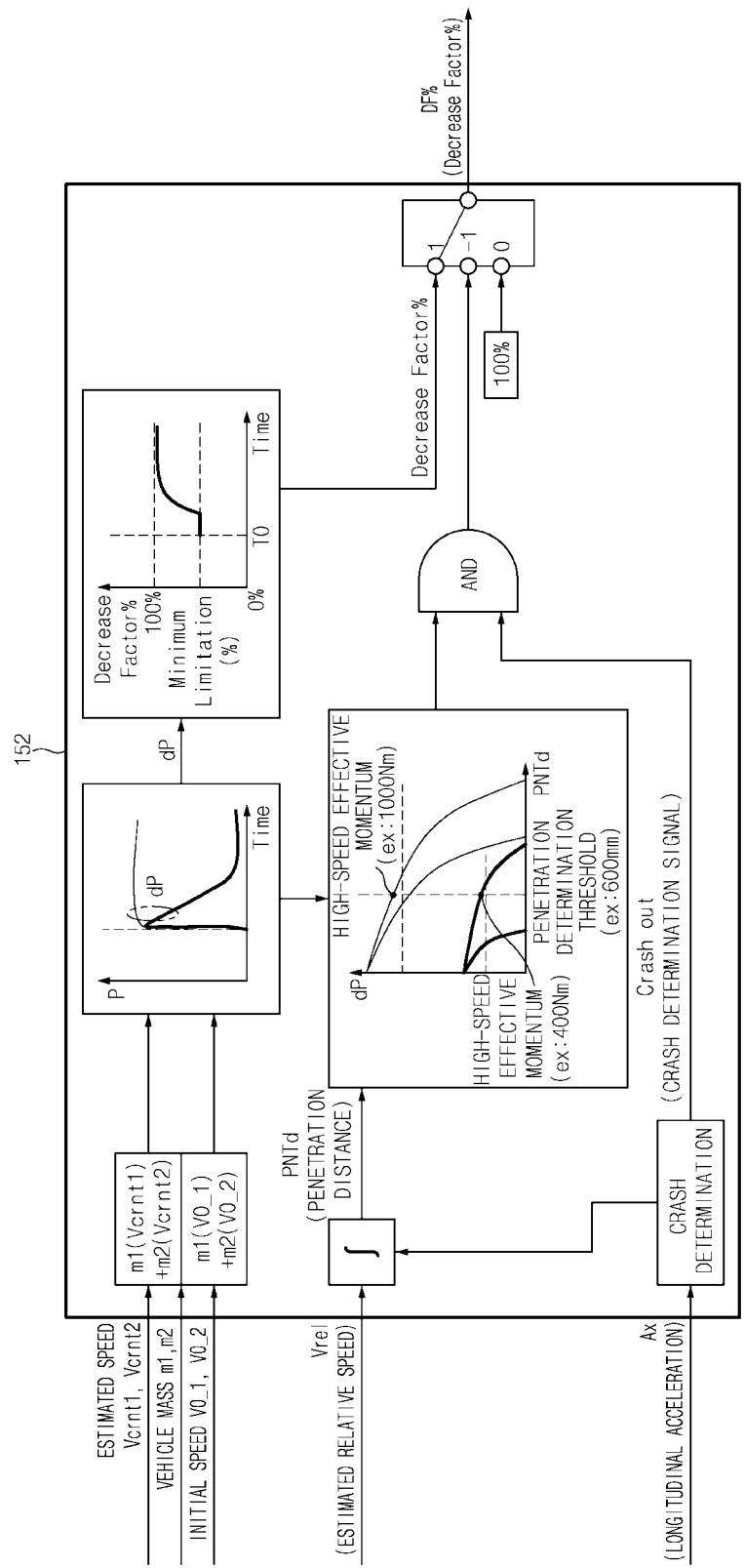
Figure 9:
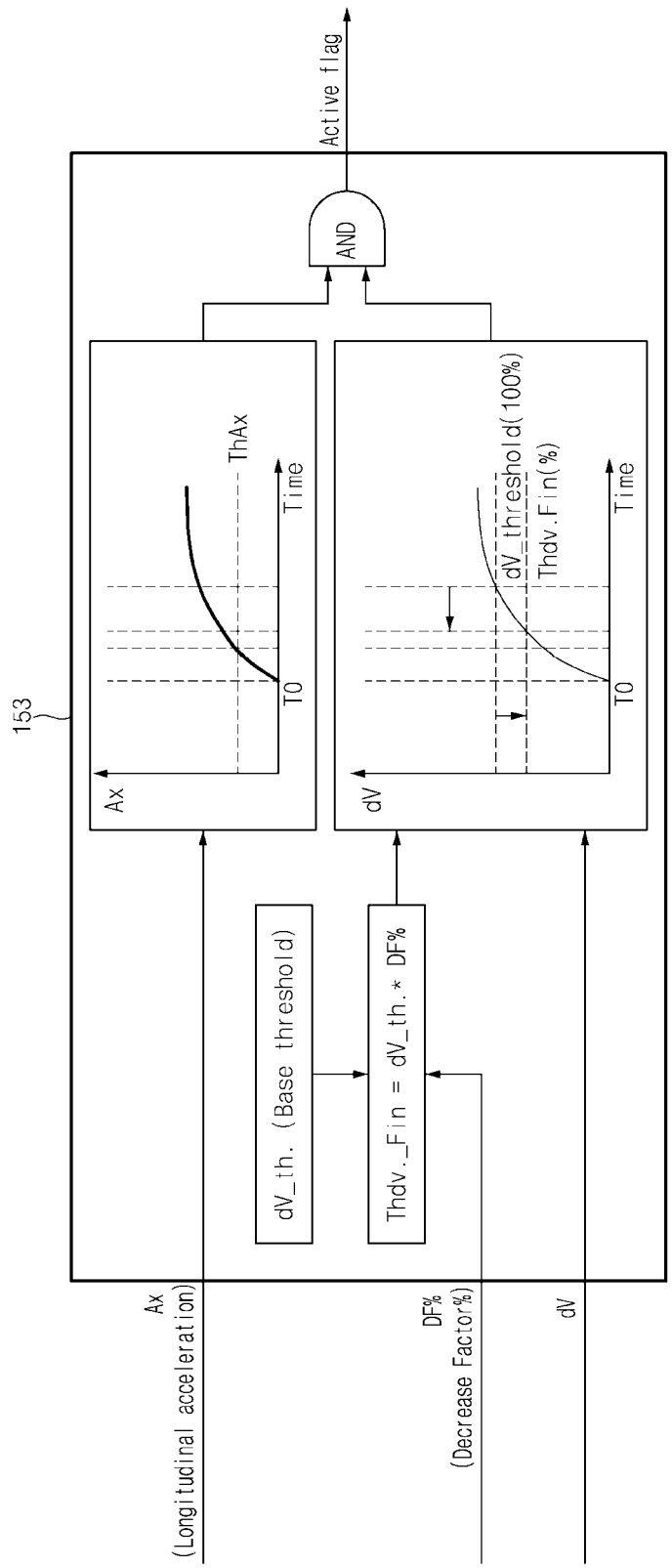

FIGS. 7 to 9 are diagrams for describing an airbag control method when a vehicle equipped with an airbag control apparatus collides with a moving object according to one form of the present disclosure. In the present form, a description will be given under the assumption that a moving object is a vehicle.

Referring to FIG. 7, when a vehicle collides with another vehicle, the signal processor 151 of the vehicle may receive the longitudinal acceleration Ax, a crash time TO, a vehicle speed V, a speed V2 of another vehicle, a vehicle mass "M" and a mass M2 of the other vehicle.

The signal processor 151 may accumulate the longitudinal acceleration Ax to calculate the cumulative speed dV and estimate an estimated current speed Vcrnt1 of the vehicle based on the initial crash speed V0 and the cumulative speed dV. In addition, the signal processor 151 may estimate an estimated current speed Vcrnt2 of the other vehicle in consideration of the cumulative speed dV obtained by accumulating an acceleration sensor value Ax of the vehicle based on the vehicle speed V2 of the other vehicle immediately before crash. The signal processor 151 may store the vehicle speed V and the speed V2 of the other vehicle immediately before the crash as an initial crash speed V0_1 of the vehicle and an initial crash speed V0_2 of the other vehicle, respectively. The signal processor 151 may digitize the masses M and M2 of the vehicle and the other vehicle and output the masses as m1 and m2.

Referring to FIG. 8, the estimator 152 of the vehicle may calculate a current momentum of the vehicle and a current momentum of the other vehicle using the estimated current speeds Vcrnt1 and Vcrnt2 of the vehicle and the other vehicle estimated by the signal processor 151, and the masses m1 and m2 of the vehicle and the other vehicle and obtain the current momentum (post-crash momentum) Pcrnt by adding the two calculated momentums. In addition, the estimator 152 may calculate the pre-crash momentum of the vehicle and the pre-crash momentum of the other vehicle by using the initial crash speed V0_1 of the vehicle, the initial crash speed V0_2 of the other vehicle, and the masses m1 and m2 of the vehicle and the other vehicle and perform an addition operation to calculate the momentum P before crash.

The estimator 152 may determine a threshold decrease factor DF % using the effective momentum dP, which is the difference between the pre-crash momentum P and the current momentum Pcrnt, because the current momentum Pcrnt varies in real time. The airbag deployment may be advanced by predicting an impact amount using the speed and/or mass information of the other vehicle even when the vehicle is stopped, because the threshold decrease factor DF % is determined based on the effective momentum. On the other hand, when the momentum is large but the rigidity of a crash object is small or when the vehicle moves along with the crash object upon a high-speed crash, it is not necessary to deploy the airbag quickly. Therefore, after calculating the penetration distance of the crash object using the estimated current speed of the vehicle, the DF % that lowers the airbag deployment threshold may be finally set when there is a remaining effective momentum in a situation in which the object sufficiently penetrates the airbag. The penetration amount threshold may be set to a position of a battery or junction box supplying power to the airbag control apparatus, and the reference of the effective momentum may be set to an effective momentum generated at a corresponding time through a vehicle test based on a required deployment determination time.

The effective momentum may be set by comparing a momentum obtained in the case of a typical crash test with a momentum in the case of an atypical object crash test made at the same speed, and a corresponding effective momentum threshold may be set using interpolation according to the initial crash speed, because the vehicle test data is difficult to be obtained at every speed.

Referring to FIG. 9, the controller 153 may lower the airbag deployment threshold (cumulative speed reference threshold) to advance the airbag deployment by applying the finally-determined threshold decrease factor to the default airbag deployment threshold (cumulative speed threshold).

Figure 10:
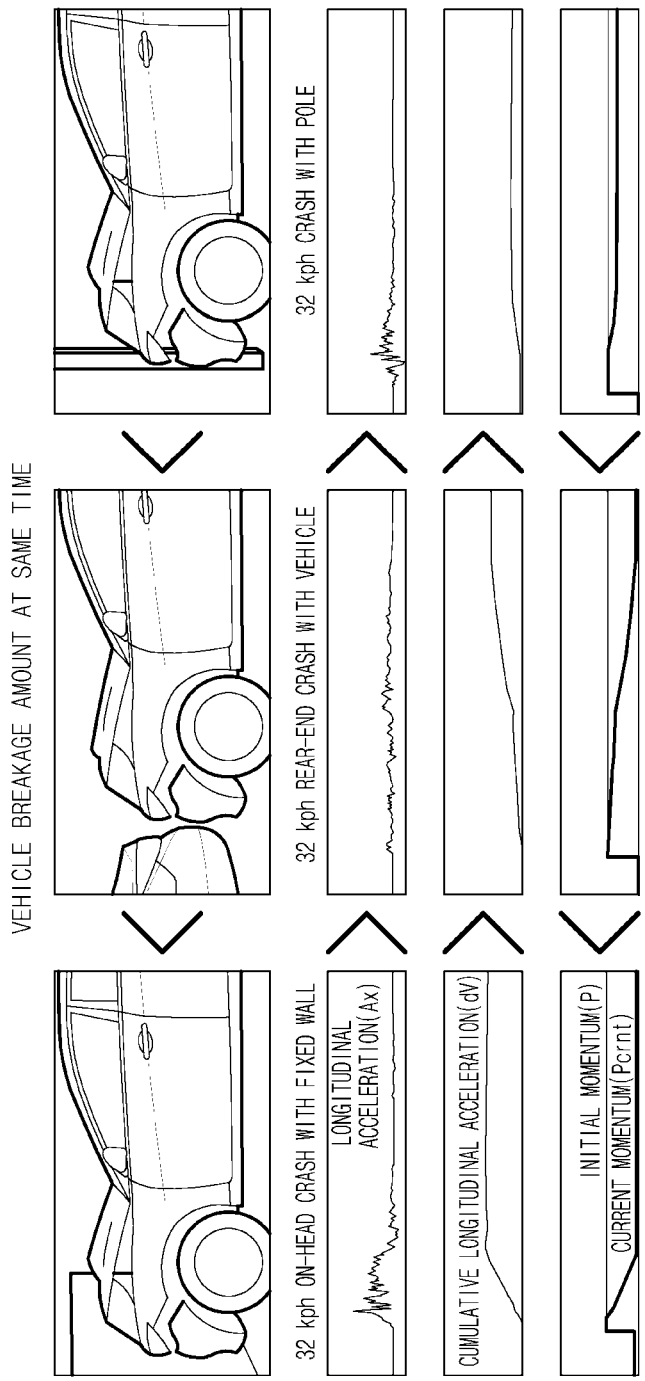
FIG. 10 is a diagram comparing longitudinal accelerations, cumulative speeds, pre-crash and post-crash momentums according to one form of the present disclosure.
Figure 11A:
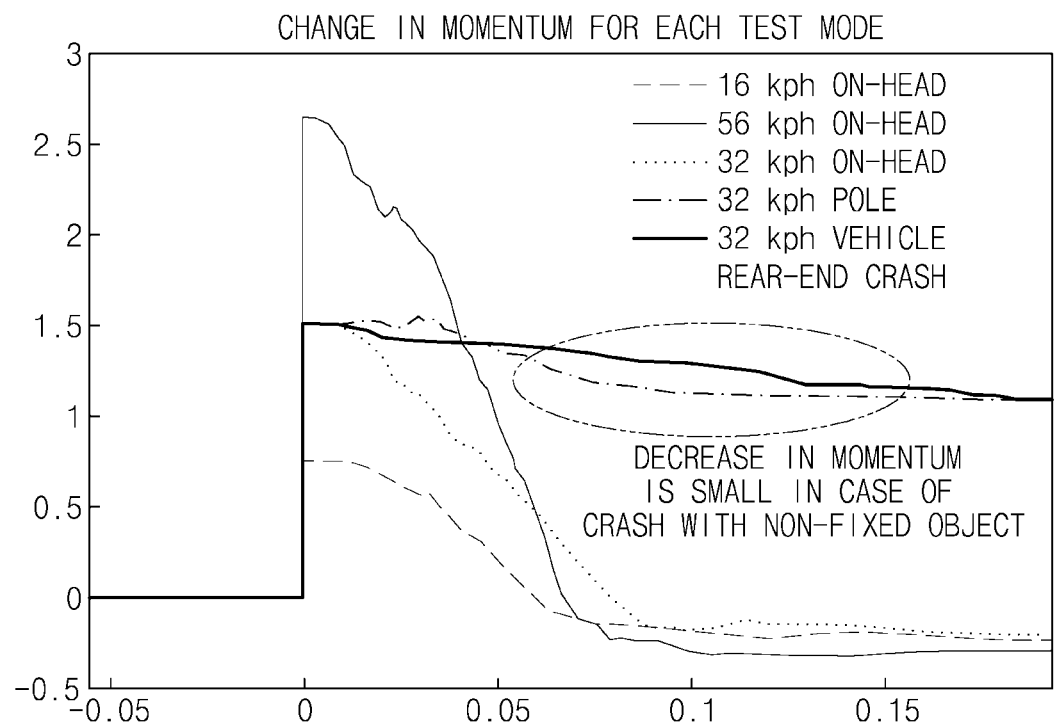
FIGS. 11A and 11B illustrate a change in momentum according to a crash object in one form of the present disclosure.
Figure 11B:
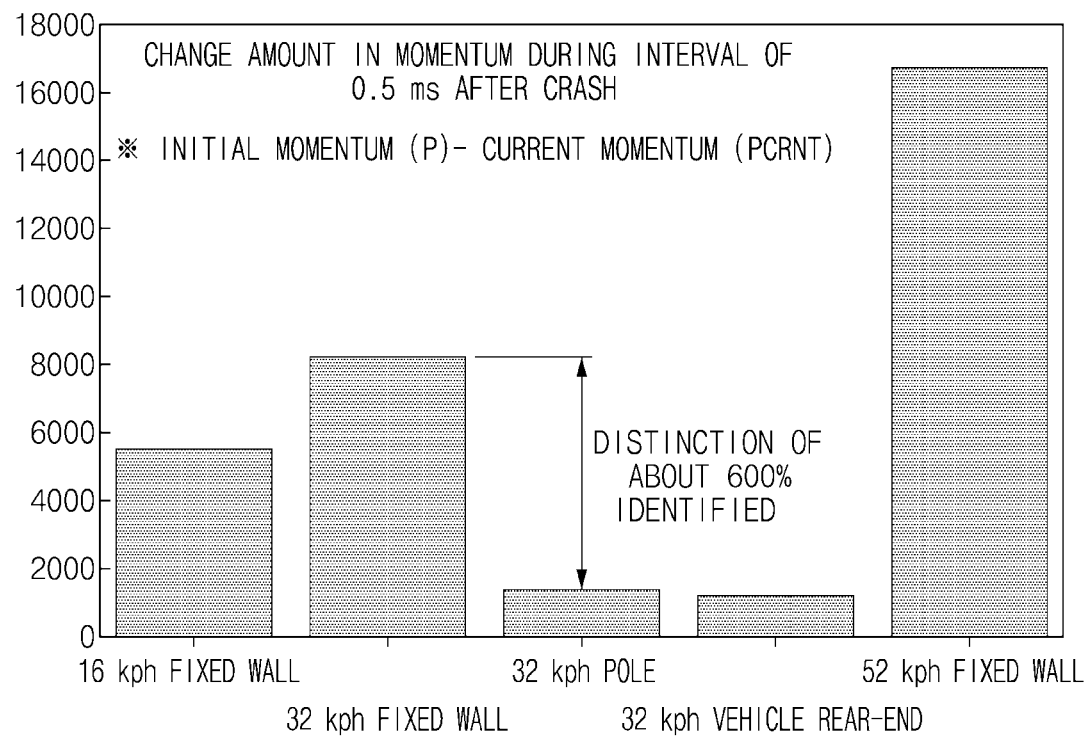
Figure 12A:
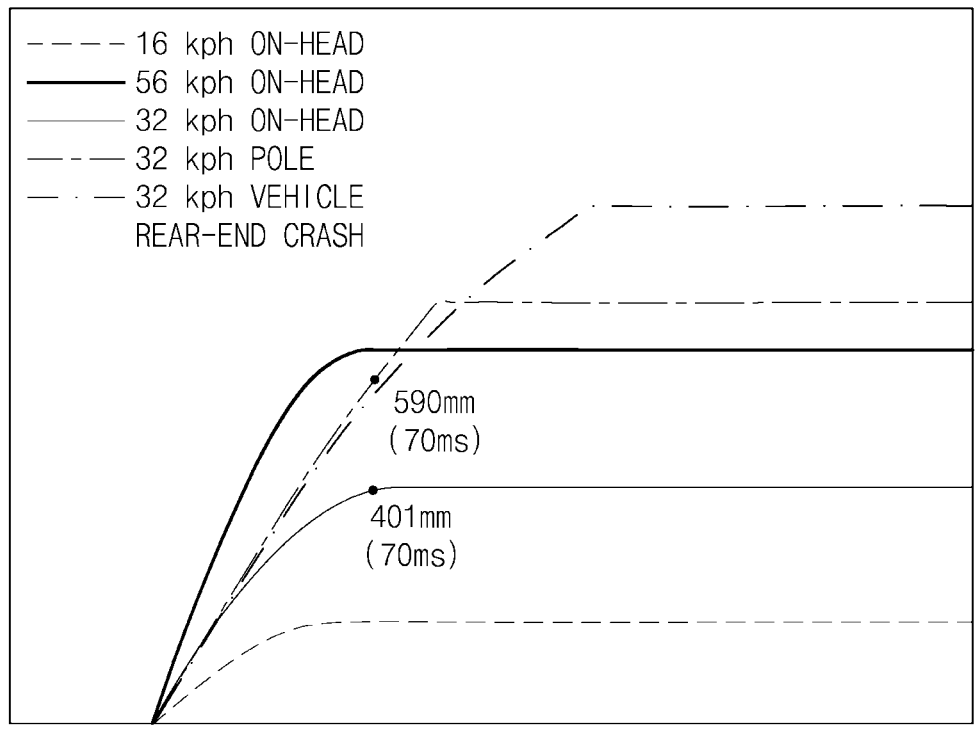
FIG. 12A is a graph estimating a crash object penetration amount according to a crash object in one form of the present disclosure.
Figure 12B:
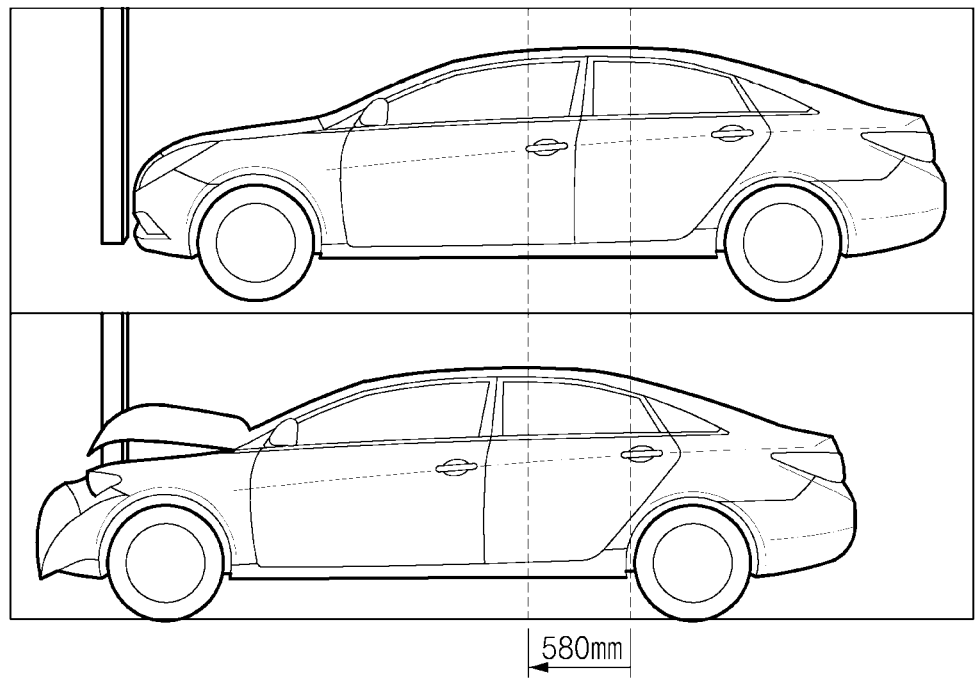
FIGS. 12B and 12C are diagrams showing actual crash object penetration amounts according to a crash object in one form of the present disclosure.
Figure 12C:
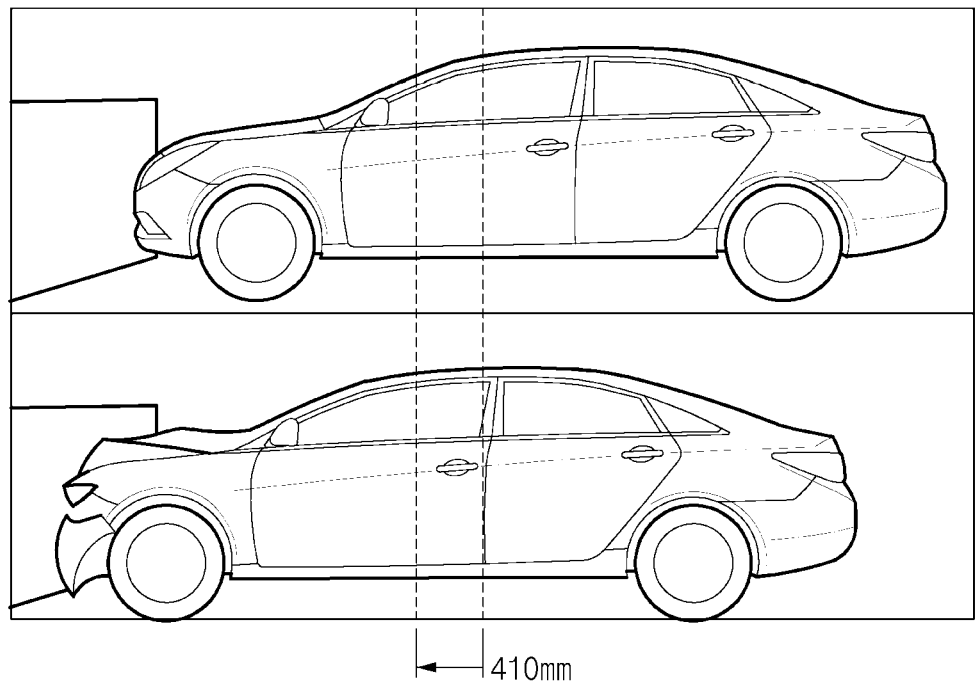
Figure 13:
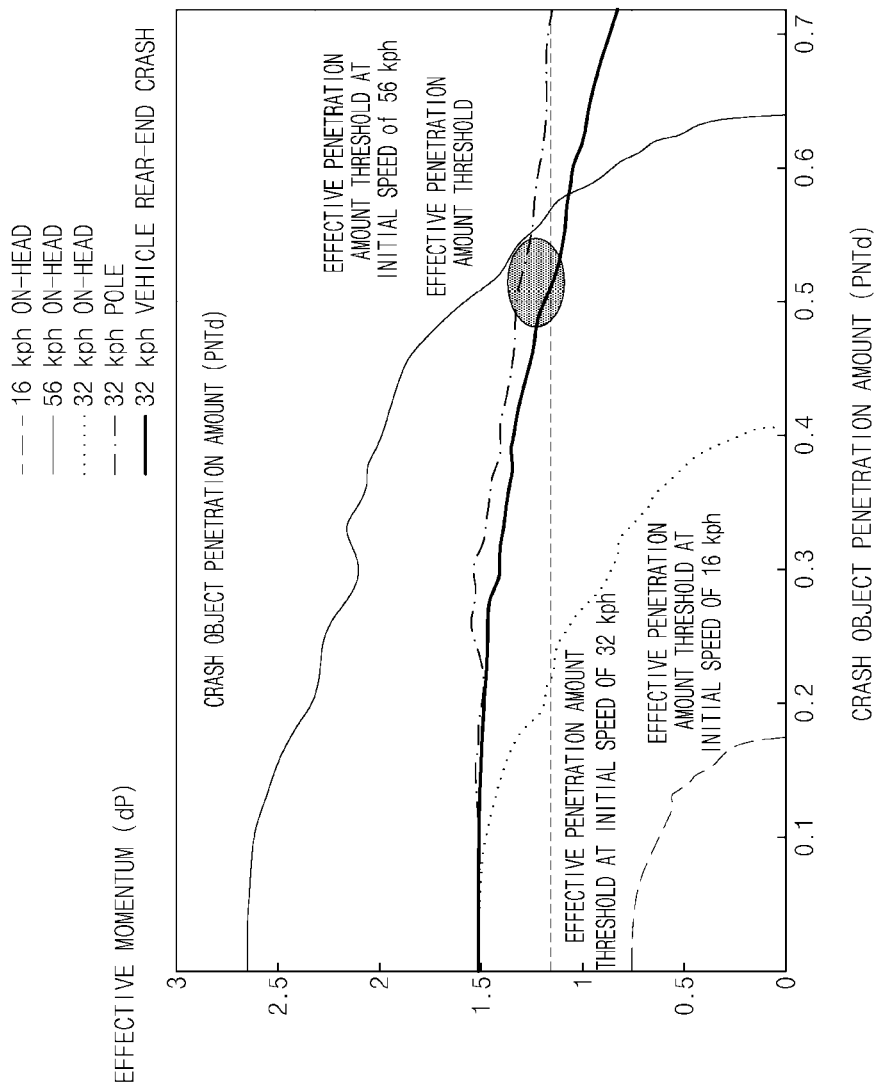
FIG. 13 is a graph showing an airbag deployment time according to an effective momentum and a crash object penetration amount in one form of the present disclosure.
Figure 14:
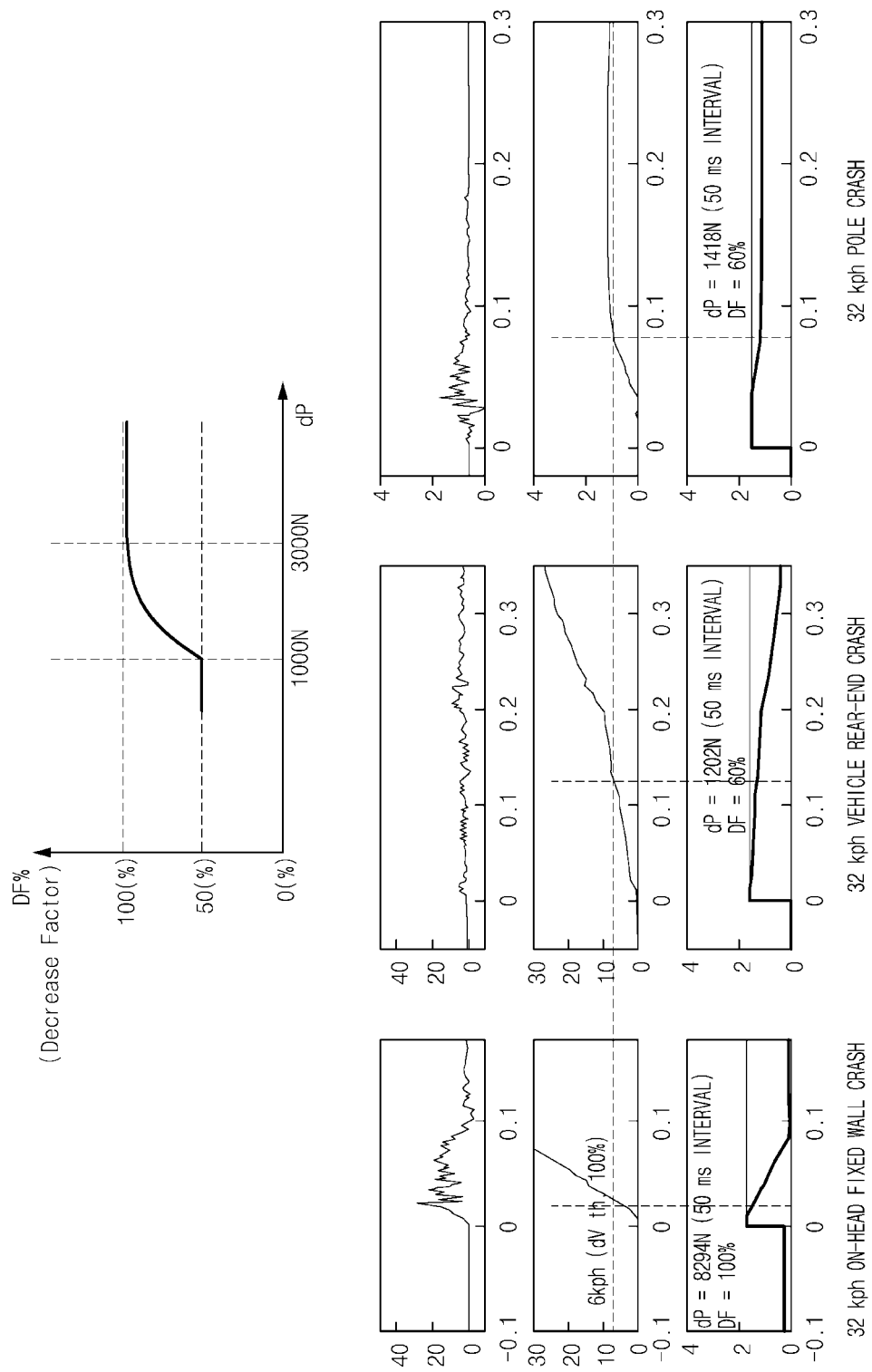
FIGS. 14 and 15 are exemplary diagrams for comparing airbag control technique of the present disclosure with that of the prior art.
Figure 15:
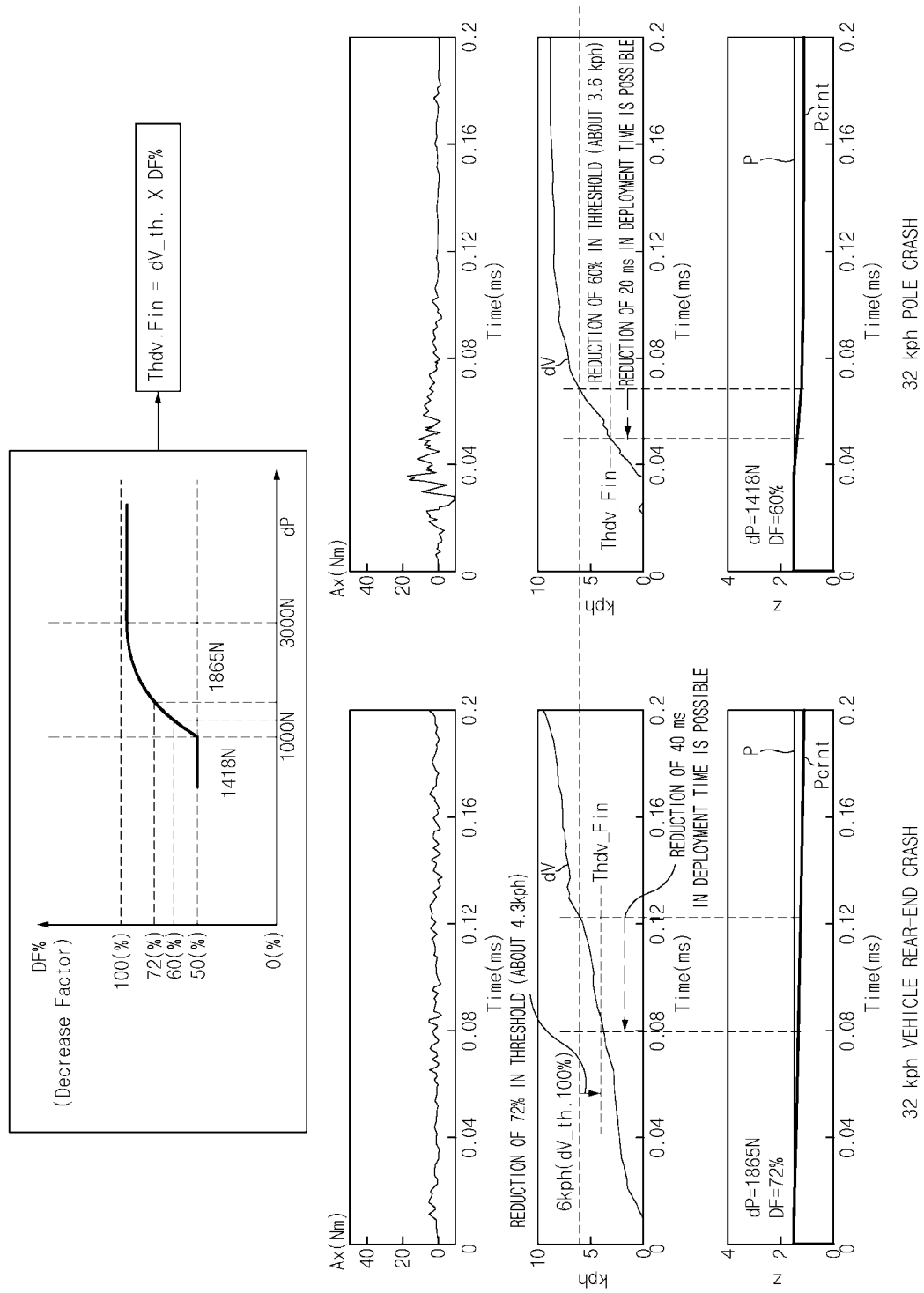

FIG. 10 is a diagram comparing longitudinal accelerations, cumulative speeds, pre-crash and post-crash momentums according to the present disclosure, and FIGS. 11A and 11B illustrate a change in momentum according to a crash object according to the present disclosure. FIG. 12A is a graph estimating a crash object penetration amount according to a crash object according to the present disclosure, FIGS. 12B and 12C are diagrams showing actual crash object penetration amounts according to a crash object according to the present disclosure, and FIG. 13 is a graph showing an airbag deployment time according to an effective momentum and a crash object penetration amount according to one form of the present disclosure, and FIGS. 14 and 15 are exemplary diagrams for comparing the airbag control technique of the present disclosure with that of the prior art.

As shown in FIG. 10, in the case of the same speed crash, when different acceleration sensor values according to crash objects are output, the acceleration sensor values may be input in proportion to the weight, rigidity, or relative speed of a crash object. For example, in the case of a crash object having a narrow crash area such as a telephone pole or pole, an input longitudinal acceleration may be low, but a vehicle damage may be large, and the crash object may penetrate a vehicle structure deeply, so that the development time may be adjusted by estimating the pre-crash and post-crash momentums of the vehicle.

In the case of a crash with an unfixed object, a damaged portion may be large but the input longitudinal acceleration may be small, so that a more momentum remains at the same time as shown in FIG. 11A. According to the vehicle test data as shown in FIG. 11B, the distinction by change amounts in momentum is ensured in the case of crash with a non-fixed object, and it is possible to improve performance of determining whether to deploy the airbag before a driver has a big impact using the information on the crash object (e.g., vehicle) in the case of a crash with a non-fixed object or the vehicle-to-vehicle crash by adjusting the airbag deployment threshold according to the distinction.

In the case of an unfixed object (moving object) or an atypical crash, a vehicle speed may be maintained even after the crash and the vehicle may be damaged continuously during the time the vehicle speed is maintained. The similar trend are shown when comparing the internal penetration amount of a crash object according to the estimated vehicle speed (estimated current speed) after the crash for each test mode of FIG. 12A and the internal penetration amount of the crash object in the case of an actual vehicle test under the same test conditions of FIGS. 12B and 12C.

According to some forms of the present disclosure, it may be estimated that a large amount of momentum remains in a situation where the cash object penetrates the vehicle by the effective penetration amount threshold of 500 mm or more as shown in FIG. 13. In this case, serious damage of the vehicle may be expected, so that when the longitudinal acceleration continues to increase after the crash, the airbag deployment time may be advanced by adjusting the airbag deployment threshold.

For example, referring to FIG. 14, the airbag deployment threshold (cumulative speed threshold) is set to 6 kph in the prior art, and when the vehicle collides with a fixed object, the airbag may be deployed 20 ms after the crash and when the vehicle collides with a moving object, the airbag may be deployed 100 ms after the crash. Meanwhile, referring to FIG. 15, when the airbag control method of the present disclosure is applied, the airbag deployment time may be shortened by 40 ms in the case of rear-end crash or 20 ms in the case of pole crash after crash. That is, the present disclosure is able to control the airbag deployment time by adjusting the airbag deployment threshold in accordance with a crash situation.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure. Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

According to the present disclosure, it is possible to deploy an airbag quickly when the airbag deployment is desired in such a manner to adjust an airbag deployment time by estimating the momentum of the vehicle and a crash object penetration amount immediately before crash based on a longitudinal acceleration, a vehicle speed, and a vehicle mass.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An airbag control apparatus comprising:
   an airbag;
   an airbag driver configured to deploy the airbag; and
   a processor configured to:
      estimate a vehicle momentum and a crash progress degree based on a longitudinal acceleration and a vehicle speed upon a vehicle crash;
      determine deployment of the airbag based on the vehicle momentum and the crash progress degree; and
      control the airbag driver when the deployment of the airbag is determined,
   wherein the processor comprises:
      an estimator configured to:
         calculate a crash object penetration distance based on the longitudinal acceleration and the vehicle speed, and
         determine a threshold decrease factor based on the vehicle momentum and the crash object penetration distance; and
      a controller configured to:
         determine an airbag deployment threshold based on the threshold decrease factor, and
         determine whether to deploy the airbag based on the airbag deployment threshold.

2. The airbag control apparatus of claim 1, wherein the processor further includes:
a signal processor configured to calculate and output a cumulative speed, an initial crash speed, and an estimated current speed by using the longitudinal acceleration and the vehicle speed input from sensors and in-vehicle devices mounted on a vehicle, and
wherein the estimator configured to:
calculate the vehicle momentum and the crash object penetration distance based on the longitudinal acceleration, the initial crash speed, and the estimated current speed.

3. The airbag control apparatus of claim 2, wherein the signal processor is configured to calculate a vehicle mass based on at least one of an occupant weight, a load weight measured by a weight sensor, or an empty-vehicle weight.

4. The airbag control apparatus of claim 3, wherein the estimator is configured to calculate a pre-crash momentum and a current momentum based on the initial crash speed, the estimated current speed, and the vehicle mass.

5. The airbag control apparatus of claim 4, wherein the estimator is configured to determine the threshold decrease factor based on a difference between the pre-crash momentum and the current momentum.

6. The airbag control apparatus of claim 4, wherein the estimator is configured to calculate an effective momentum based on the initial crash speed, the estimated current speed, and the vehicle mass when a crash target is a fixed object.

7. The airbag control apparatus of claim 4, wherein the estimator is configured to calculate an effective momentum based on a relative initial crash speed of a moving object, the estimated current speed, the vehicle mass and a weight of the moving object when a crash target is the moving object.

8. The airbag control apparatus of claim 4, wherein the estimator is configured to calculate the crash object penetration distance based on a crash time, a current time, the estimated current speed, the initial crash speed, and the longitudinal acceleration.

9. The airbag control apparatus of claim 8, wherein the controller is configured to determine the deployment of the airbag when the longitudinal acceleration is greater than or equal to an acceleration threshold and the cumulative speed is greater than or equal to the airbag deployment threshold.

10. The airbag control apparatus of claim 2, wherein the controller is configured to determine the airbag deployment threshold by applying the threshold decrease factor to a default basic airbag deployment threshold.

11. An airbag control method, comprising:
detecting, by a sensor, a longitudinal acceleration and a vehicle speed upon a vehicle crash;
estimating, by a processor, a vehicle momentum and a crash progress degree based on the longitudinal acceleration and the vehicle speed;
determining, by the processor, deployment of an airbag based on the vehicle momentum and the crash progress degree; and
deploying, by an airbag driver, the airbag when the deployment of the airbag is determined,
wherein estimating the vehicle momentum and the crash progress degree includes:
calculating a crash object penetration distance using the longitudinal acceleration and the vehicle speed, and
wherein determining the deployment of the airbag includes:
determining a threshold decrease factor based on the vehicle momentum and the crash object penetration distance;
determining an airbag deployment threshold based on the threshold decrease factor; and
determining whether to deploy the airbag based on the airbag deployment threshold.

12. The airbag control method of claim 11, wherein estimating the vehicle momentum and the crash progress degree further includes:
calculating a cumulative speed, an initial crash speed, and an estimated current speed using the longitudinal acceleration and the vehicle speed,
calculating a pre-crash momentum, a current momentum and an effective momentum based on the longitudinal acceleration, the initial crash speed and the estimated current speed, and
calculating the crash object penetration distance using the longitudinal acceleration and the estimated current speed.

13. The airbag control method of claim 12, further comprising:
calculating a vehicle mass based on at least one of a passenger weight, a load weight measured by a weight sensor, or an empty-vehicle weight when calculating the cumulative speed, the initial crash speed, and the estimated current speed.

14. The airbag control method of claim 13, wherein the pre-crash momentum and the current momentum are calculated using the initial crash speed, the estimated current speed, and the vehicle mass.

15. The airbag control method of claim 14, wherein a threshold decrease factor is determined based on a difference between the pre-crash momentum and the current momentum.

16. The airbag control method of claim 13, wherein the effective momentum is calculated using the initial crash speed, the estimated current speed, and the vehicle mass when a crash target is a fixed object.

17. The airbag control method of claim 13, wherein the effective momentum is calculated using a relative initial crash speed of a moving object, an estimated current speed, the vehicle mass and a weight of the moving object when a crash target is the moving object.

18. The airbag control method of claim 11, wherein determining the airbag deployment threshold includes:
determining the airbag deployment threshold by applying the threshold decrease factor to a default basic airbag deployment threshold.

19. The airbag control method of claim 11, wherein determining whether to deploy the airbag includes:
determining the deployment of the airbag when the longitudinal acceleration is greater than or equal to an acceleration threshold and the cumulative speed is greater than or equal to the airbag deployment threshold.

* * * * *